US012331708B2

(12) United States Patent
Ledford et al.

(10) Patent No.: US 12,331,708 B2
(45) Date of Patent: Jun. 17, 2025

(54) INJECTION CONTROL VALVE IN FUEL INJECTOR CONFIGURED FOR PRESSURE RELIEF

(71) Applicant: Caterpillar Inc., Peoria, IL (US)

(72) Inventors: Jeffrey E. Ledford, Chenoa, IL (US); Mitchell Juchems, Eureka, IL (US); Andrew O. Marrack, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/489,037

(22) Filed: Oct. 18, 2023

(65) Prior Publication Data

US 2025/0129760 A1 Apr. 24, 2025

(51) Int. Cl.

*F02M 63/00* (2006.01)
*F02M 51/06* (2006.01)
*F02M 55/00* (2006.01)
*F02M 61/20* (2006.01)

(52) U.S. Cl.

CPC ...... *F02M 63/005* (2013.01); *F02M 51/0625* (2013.01); *F02M 55/008* (2013.01); *F02M 61/20* (2013.01); *F02M 63/0054* (2013.01)

(58) Field of Classification Search

CPC ............. F02M 63/005; F02M 63/0054; F02M 51/0625; F02M 55/008; F02M 61/20
USPC ............................... 239/533.2; 123/506, 459
See application file for complete search history.

(56) References Cited

U.S. PATENT DOCUMENTS

| | | | | |
|---|---|---|---|---|
| 6,595,189 | B2 * | 7/2003 | Coldren | F02M 45/00 123/468 |
| 10,072,596 | B2 | 9/2018 | Dames et al. | |
| 11,105,304 | B2 | 8/2021 | Kim et al. | |
| 11,280,306 | B1 * | 3/2022 | Bannur Nagaraja | F02M 61/14 |

FOREIGN PATENT DOCUMENTS

| | | | | |
|---|---|---|---|---|
| DE | 3700356 | C2 | 7/1995 | |
| DE | 10155674 | A1 | 5/2003 | |
| DE | 102007038430 | A1 * | 2/2009 | F02M 47/06 |
| DE | 102012012890 | A1 * | 1/2014 | F02M 47/027 |
| EP | 1939440 | B1 | 6/2013 | |
| JP | 2000087821 | A * | 3/2000 | |
| RU | 2543909 | C2 * | 3/2015 | |

OTHER PUBLICATIONS

DE-102012012890-A1 (Kalenborn et al.) (Jan. 2, 2014) (Machine Translation) (Year: 2014).*

* cited by examiner

*Primary Examiner* — Mahmoud Gimie
(74) *Attorney, Agent, or Firm* — Brannon Sowers & Cracraft PC

(57) ABSTRACT

A fuel injector includes a nozzle, and a nozzle check including a closing hydraulic surface. The fuel injector also includes a high pressure passage, a low pressure drain, a control passage, a check control chamber, and a valve seat. A relief passage is formed by at least one of an injector housing or a control valve in a control valve assembly. The control valve is movable among a rest position, a lifted injection position, and a lifted relief position where the high pressure passage connects to the relief passage. The control valve can be operated to selectively connect the high pressure passage to the relief passage to bleed fuel pressure to prevent over-pressurization. Related apparatus and methodology is also disclosed.

20 Claims, 3 Drawing Sheets

INJECTION CONTROL VALVE IN FUEL INJECTOR CONFIGURED FOR PRESSURE RELIEF

TECHNICAL FIELD

The present disclosure relates generally to a fuel injector, and more particularly to a control valve in a fuel injector movable to a relief position to relieve fuel pressure.

BACKGROUND

Electrically actuated fuel injectors have been used for many years in a range of engine platforms. In a conventional design an injection valve is selectively opened and closed to control the injection of fuel into an engine cylinder at a desired injection timing, amount, and sometimes injection rate shape. Some fuel injectors rely principally upon a pressure of fuel supplied to the injector to actuate open an injection valve at a desired timing. Other systems employ a separate control valve that operates to directly control a closing hydraulic pressure on the injection valve to more precisely control the timing and manner of fuel injection. Designs are well-known where a pressurized fuel reservoir is provided that supplies pressurized fuel to multiple fuel injectors at an injection pressure. Other strategies, sometimes referred to as unit injectors, pressurize the fuel to an injection pressure within each individual fuel injector, employing a hydraulically-actuated or cam-actuated piston or plunger to perform the fuel pressurization. Many different versions and extensions directed to applications and improvements on these two basic strategies are known, especially in the field of compression-ignition engines.

Increasingly stringent regulations in recent years have continued to drive the search for improved and alternatively configured fuel injectors. It has long been observed that precise control over fuel injector operation can have various benefits respecting emissions and fuel efficiency. One factor well-known to improve emissions, at least in part by optimizing fuel spray vaporization and enabling rapid injection of precise amounts of fuel, is higher fuel pressure. Thus, engineers have been motivated to design fuel injectors that can inject fuel at very high injection pressures ranging into the hundreds of megapascals (mPa). While utilizing high injection pressures has proven beneficial in many instances, the hardware capabilities of fuel injectors can be tested under such conditions. U.S. Pat. No. 11,105,304B2 to Kim et al. is directed to a fuel injector employing a residually stressed solenoid housing for improved pressure capability.

SUMMARY

In one aspect, a fuel injector includes an injector housing having a nozzle and a nozzle check movable to open and close the nozzle and including a closing hydraulic surface. The fuel injector further includes an electrically actuated control valve assembly having a control valve, and an armature. A high pressure passage, a low pressure drain, a control passage, a check control chamber fluidly connected to the control passage, and a valve seat are each formed in the injector housing, and a relief passage is formed by at least one of the injector housing or the control valve. The control valve is movable among the rest position in contact with the control valve seat and blocking the control passage from the low pressure drain to maintain a high pressure in the control chamber, a lifted injection position where the control passage is fluidly connected to the low pressure drain, and a lifted relief position where the high pressure passage is fluidly connected to the relief passage.

In another aspect, a fuel system includes a fuel supply and a fuel injector including therein a fuel inlet fluidly connected to the fuel supply, and a high pressure passage extending from a plunger cavity, a control passage, and a low pressure drain. The fuel injector further includes an electrically actuated spill valve fluidly between the fuel inlet and the plunger cavity, a nozzle check having a closing hydraulic surface exposed to a fluid pressure of the control passage, and an electrically actuated control valve. The control valve includes a 3-position valve blocking the control passage from the low pressure drain at a rest position, and fluidly connecting the control passage to the low pressure drain at a lifted injection position. The fuel injector further includes therein a relief passage, and the control valve fluidly connects the high pressure passage to the relief passage at a lifted relief position that is between the rest position and the lifted injection position.

In still another aspect, a method of operating a fuel system includes advancing a plunger in the fuel system to increase a pressure of fuel in a plunger cavity, and energizing or deenergizing a solenoid in a fuel injector during the advancing the plunger to move a control valve to a lifted relief position from one of a rest position blocking a control passage from a low pressure drain and a lifted injection position where the control passage is fluidly connected to the low pressure drain. The method further includes fluidly connecting a high pressure passage extending from the plunger cavity to a relief passage, based on the moving the control valve to the lifted relief position, to relieve a pressure of fuel in the plunger cavity, and holding a nozzle check closed via a pressure of fuel on a closing hydraulic surface of a nozzle check exposed to a fluid pressure of the control passage, during the relieving the pressure of fuel in the plunger cavity.

DETAILED DESCRIPTION

Figure 1:
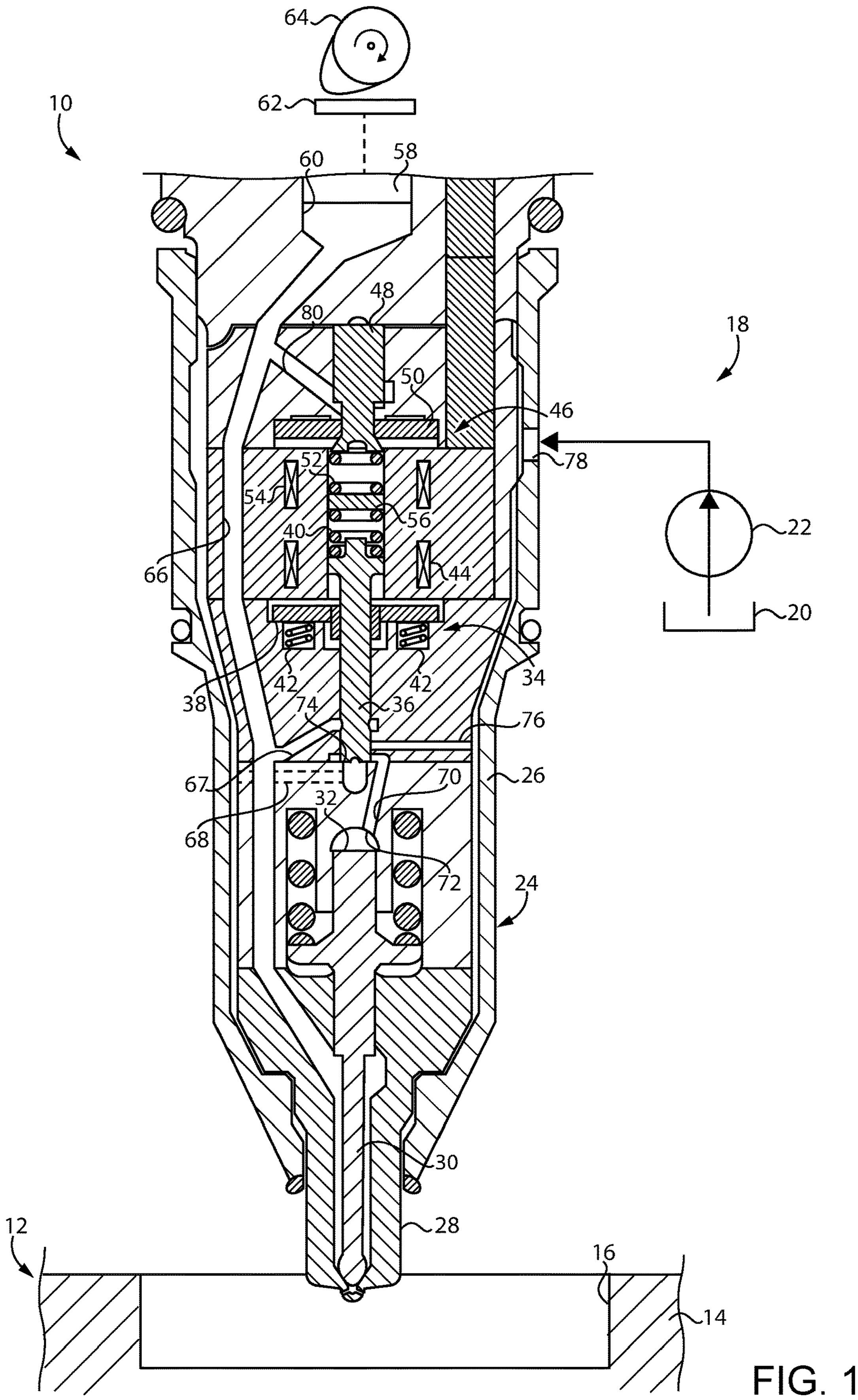
FIG. 1 is a sectioned side diagrammatic view of an internal combustion engine system, according to one embodiment.

Referring to FIG. 1, there is shown an internal combustion engine system 10, according to one embodiment. Engine system 10 includes an internal combustion engine 12 having an engine housing 14 with a combustion cylinder 16 formed therein. Cylinder 16 may be one of any number of cylinders in any suitable arrangement such as an in-line pattern, a V-pattern, or still another. It will be appreciated that a piston is movable in cylinder 16 between a bottom-dead center position and a top-dead center position, typically in a four-stroke engine cycle. Engine system 10 may be compression ignited such that piston reciprocation in cylinder 16 causes an increase to a pressure of fluids therein to an autoignition threshold. Engine system 10 may thus operate on a suitable compression ignition fuel, such as a diesel distillate fuel. Other engine operating, fueling, and ignition strategies are nevertheless within the scope of the present disclosure. Engine system 10 may be applied for diverse purposes ranging from vehicle propulsion for a land vehicle or a marine vessel to electric power generation, operation of a compressor, pump, or still others.

Engine system 10 also includes a fuel system 18 having a fuel supply 20 containing a liquid fuel, and a fuel pump 22 structured to convey the fuel to one or more fuel injectors 24, as shown in FIG. 1. Fuel injector 24 may be one of a plurality of interchangeable fuel injectors each associated with one of a plurality of cylinders in engine 12 and positioned for direct injection of the fuel therein in a practical implementation strategy. Description and discussion herein of a fuel injector in the singular, or any component thereof, should be understood to refer by way of analogy to any other fuel injector or respective component as might be used in fuel system 18.

Fuel injector 24 includes an injector housing 26 having a nozzle 28 with a plurality of nozzle outlets 31 formed therein and each fluidly connecting to cylinder 16. Fuel injector 24 also includes a nozzle check 30 having, for example, the form of a needle valve or the like, moveable to open and close nozzle outlets 31 in nozzle 28 and having a closing hydraulic surface 32. Fuel injector 24 also includes an electrically actuated control valve assembly 34 having a control valve 36, and an armature 38. Control valve assembly 34 also includes a first biasing spring 40 and one or more second biasing springs 42, the purpose and functionality of which is further discussed herein. A solenoid 44 is also part of control valve assembly 34 and is energized by way of electrical control currents to magnetically attract armature 38 to move control valve 34 among a plurality of different positions, as also further discussed herein.

Fuel injector 24 also includes an electrically actuated spill valve assembly 46. Spill valve assembly 46 includes a spill valve 48, an armature 50, a biasing spring 52, and a solenoid 54. A spring stop 56 may be positioned at a fixed location in injector housing 26 between spring 40 and spring 52. Solenoid 54 and solenoid 44 may in some embodiments be positioned in a common solenoid assembly although the present disclosure is not thereby limited. The illustrated design employing spring stop 56 differs from certain other designs employing commonly housed solenoids for a control valve in a spill valve that utilize a common biasing spring. Solenoid 54 can be energized via electrical control currents to attract armature 50 for moving spill valve 46 between an open position and a closed position.

A high pressure passage 66, a low pressure drain 68, a control passage 70, a check control chamber 72 fluidly connected to control passage 70, and a valve seat 74 are each formed in injector housing 26. A relief passage 76 is formed by at least one of injector housing 26 or control valve 36, and in the illustrated embodiment is formed by injector housing 26. In other embodiments an annulus and/or a longitudinal or circumferential channel formed in an outer surface of control valve 36, or potentially even an internal passage, might form a pressure relief passage as contemplated herein. Injector housing 26 also has formed therein a high pressure branch passage 67, a plunger cavity 60, a fuel inlet 78, and a spill passage 80. Another branch passage not shown in FIG. 1 may fluidly connect high pressure passage 66 directly to check control chamber 72 in some embodiments. A plunger 58 is movable between an advanced position and a retracted position in plunger cavity 60 to pressurize a fuel therein. High pressure passage 66 extends from plunger cavity 60. Plunger 58 may include a tappet 62 that is contacted by a rotating cam 64 of engine 12. In other embodiments, a plunger for fuel pressurization might be hydraulically actuated.

Spill valve 48 is fluidly between fuel inlet 78 and plunger cavity 60 and movable between an open position where plunger 58 reciprocates to draw fuel via fuel inlet 78 into and out of plunger cavity 60, and a closed position. When spill valve 50 is moved to a closed position, the fluid connection between fuel inlet 78 and spill passage 80 is blocked and moving plunger 58 toward an advanced position increases a pressure of fuel in plunger cavity 60, high pressure passage 66, and other locations fluidly connected to high pressure passage 66.

Depending upon the fuel injection strategy used, and potentially other factors, in certain instances a fuel pressure within fuel injector 24 can approach or exceed a desired fuel pressure limit when plunger 58 is advanced to pressurize fuel. The present disclosure contemplates a unique strategy for relieving or bleeding off fuel pressure selectively to avoid exceeding desired pressure limits, as further discussed herein.

To this end, control valve 34 may include a multi-position valve such as a 3-position valve movable among a rest position, a lifted injection position, and a lifted relief position. At the rest position control valve 36 is in contact with control valve seat 74 and blocks control passage 70 from low pressure drain 68 to maintain a high pressure in control chamber 72. At the lifted injection position control passage 70 is fluidly connected to low pressure drain 68, enabling a high pressure of fuel applied to nozzle check 30 from high pressure passage 66 to overcome the hydraulic pressure on closing hydraulic surface 32 and lift nozzle check 30 to inject a fuel into cylinder 16. At the rest position in contact with valve seat 74 control valve 36 permits high pressure to prevail in control chamber 72 and act on closing hydraulic service 32 to maintain nozzle check 30 closed. At the lifted relief position high pressure passage 66 is fluidly connected to relief passage 76 to enable excess pressure to be bled off to avoid over-pressurizing fuel injector 24. The bleeding of excess pressure occurs during advancing plunger 58 with spill valve 48 closed. In an embodiment, multiple injections can be performed per engine cycle, with pressure relief being performed between the multiple injections, as further discussed herein.

Figure 2:
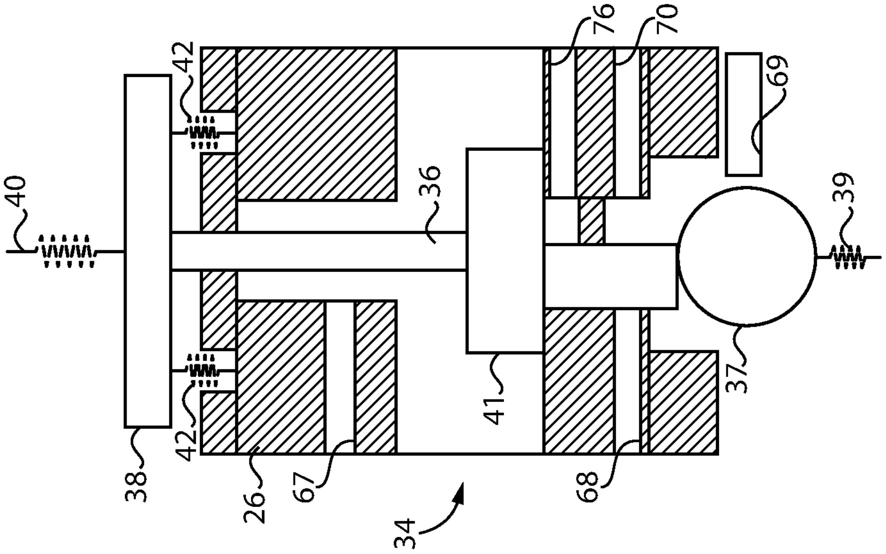
FIG. 2 is a sectioned side diagrammatic view of a control valve assembly in a fuel injector at a rest position, according to one embodiment.

Referring also now to FIG. 2, there is shown a diagrammatic illustration of a control valve assembly 34 suitable for use in fuel injector 24. Control valve assembly 34 as illustrated in FIG. 2 may have some structural differences relative to the illustration in FIG. 1. For instance, in FIG. 1 relief passage 76 is shown above where control valve 36 contacts valve seat 74 at the rest position, whereas in FIG. 2 relief passage 76 is shown below where control valve 36 contacts injector housing 26 at the rest position. In view of the present disclosure, those skilled in the art will appreciate different control valve and passage plumbing architectures within the scope of the present disclosure. Moreover, while in FIG. 1 control valve 36 is shown having a single valve piece, in FIG. 2 control valve 36 is depicted having a plurality of valve pieces including an upper piece labeled 36 and a lower piece labeled 37. It should be appreciated that embodiments are contemplated herein where a control valve includes a single valve piece, two valve pieces, a valve having protruding edges for establishing or blocking fluid connections based upon valve position, internal passages, or still other variations as suggested above.

In the illustrated embodiment, control valve 36 includes a sealing body 41 and is shown as control valve 36 might appear at a rest position with sealing body 41 in contact with injector housing 26 and where control passage 70 is fluidly connected to a high pressure branch passage 69 that extends to high pressure passage 66. At the rest position control passage 70 is blocked from low pressure drain 68 and also blocked from relief passage 76. Also shown in FIG. 2 is first biasing spring 40 biasing control valve 36 toward the rest position, and two second biasing springs 42 biasing control valve 36 away from the rest position. At the configuration shown in FIG. 2 nozzle check 30 remains closed and fuel injection does not occur.

Figure 3:
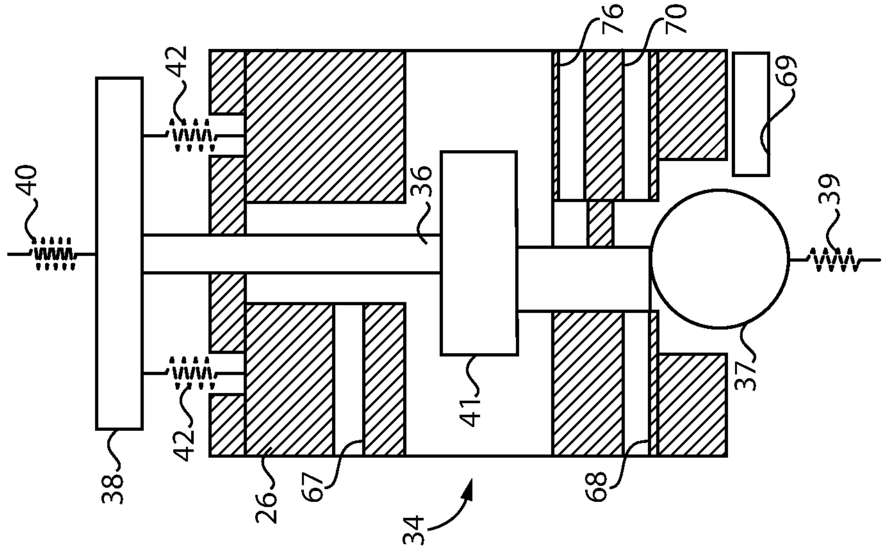
FIG. 3 is a sectioned side diagrammatic view of the control valve assembly at a lifted relief position.

Looking to FIG. 3, there is shown control valve 36 having moved to a lifted relief position where sealing body 41 does not contact injector housing 26. A third biasing spring 39 may be operative to bias control valve 36 by way of contact with valve piece 37 away from the rest position. At the lifted relief position, high pressure branch passage 67 fluidly connected to high pressure passage 66 is fluidly connected to relief passage 76. Relief passage 76 may have a relatively more restricted flow by way of a lesser cross-sectional area than high pressure passage 66 and high pressure branch passage 67. Control passage 70 remains fluidly connected to high pressure branch passage 69. At the state depicted in FIG. 3 high pressure fuel continues to be supplied by way of control passage 70 to plunger cavity 72 and acts on closing hydraulic surface 32 to hold nozzle check 30 closed. In this configuration pressure can be reduced in plunger cavity 60 by way of bleeding pressure through branch passage 67 to relief passage 76. As further discussed herein, control valve 36 may be positioned as in FIG. 3 when plunger 58 is advancing and spill valve 48 is closed. Second biasing springs 42 apply a bias to control valve 36 away from the rest position in opposition to the biasing force exerted by first biasing spring 40. At the lifted relief position control valve 36 may be substantially balanced between the respective biasing springs, such that control valve 36 can remain positioned at the lifted relief position until moved by energizing or deenergizing solenoid 44.

Figure 4:
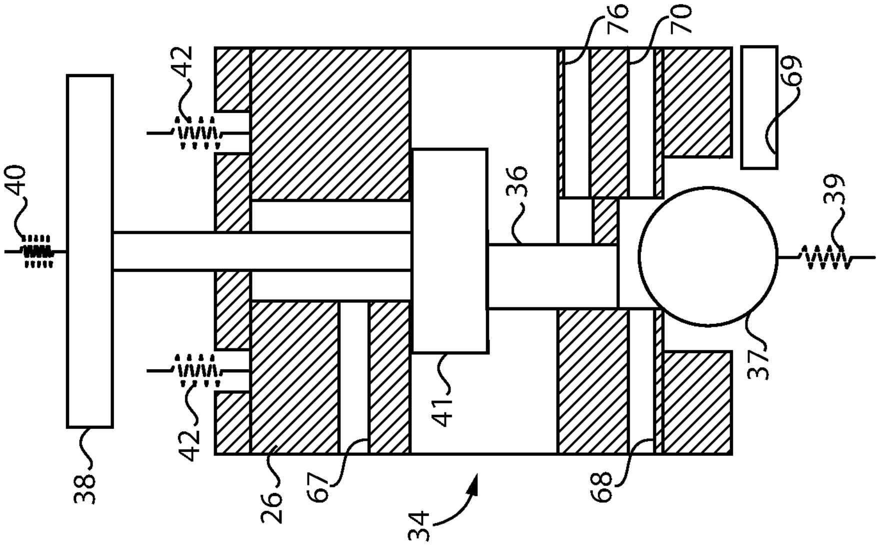
FIG. 4 is a sectioned side diagrammatic view of the control valve assembly at a lifted injection position.

Turning also now to FIG. 4, there is shown control valve 36 having been moved to the lifted injection position so as to perform an injection of fuel from fuel injector 24. In this configuration high pressure branch passage 69 is blocked from control passage 70, and control passage 70 is fluidly connected to low pressure drain 68. Sealing body 41 has been moved into contact with injector housing 26 and now blocks high pressure branch passage 67 from control passage 70, relief passage 76, and low pressure drain 68. As also illustrated in FIG. 4 second biasing springs 42 are disengaged. Control valve 36 may be movable a travel distance linearly among the rest, lifted injection, and lifted relief positions. At the lifted relief position control valve 36 may be linearly between the rest position and the lifted injection position. As can also be seen from FIGS. 2-4 the rest position may include a first stop position and the lifted injection position may include a second stop position. First biasing spring 40 may bias control valve 36 in at least a portion of the travel distance, typically an entirety of the full travel distance. The one or more second biasing springs 42 may bias control valve 36 in only a portion of the travel distance. The illustrated embodiment includes first biasing spring 40 as a closing biasing spring biasing control valve 36 toward the rest position, and second biasing springs 42 as lifting biasing springs biasing control valve 36 away from the rest position.

Figure 5:
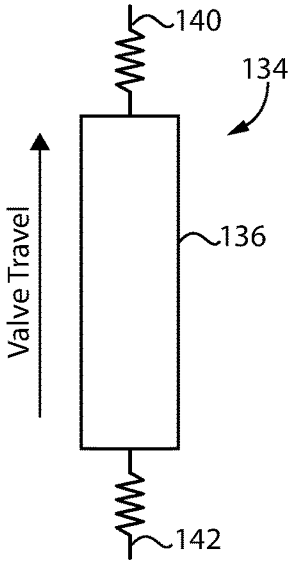
FIG. 5 is a concept diagram illustrating a biasing spring arrangement for a control valve, according to one embodiment.

Turning now to FIG. 5, there is shown a control valve assembly 134 operationally similar to control valve assembly 34 shown in FIGS. 2-4 and including a control valve 136, a first biasing spring 140, and a second biasing spring 142. FIG. 5 also illustrates a valve travel direction that is generally upward in the FIG. 5 illustration. In this embodiment first biasing spring 140 and second biasing spring 142 are positioned upon or in association with opposite ends of control valve 136. First biasing spring 140 biases control valve 136 an entirety of a travel distance between a rest position and a lifted injection position. Second biasing spring 142 biases control valve 136 only a portion of the travel distance and would typically disengage as control valve 136 moves from a lifted relief position toward a lifted injection position.

Figure 6:
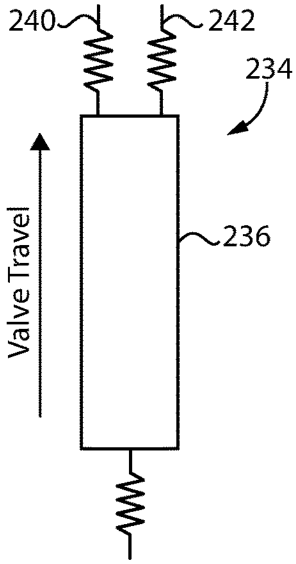
FIG. 6 is a concept diagram illustrating a biasing spring arrangement for a control valve, according to another embodiment.

Looking to FIG. 6, there is shown a control valve assembly 234 including a control valve 236, a first biasing spring 240 and a second biasing spring 242. In this embodiment both biasing springs 240 and 242 would be understood as closing biasing springs acting on or associated with the same end of control valve 236. First biasing spring 240 biases control valve 236 an entirety of a travel distance between a rest position and a lifted injection position, and second biasing spring 242 biases control valve only a part of the travel distance, biasing control valve 236 toward a rest position but engaging only beginning at a partial travel position such as a lifted relief position.

Either of the arrangements shown in FIG. 5 or 6, and still others, could be used in a fuel injector according to the present disclosure, enabling different levels of energizing of an associated solenoid to actuate a control valve from a rest position to a lifted relief position versus actuating the control valve from the lifted relief position to a lifted injection position. In an embodiment, energizing a solenoid according to the present disclosure moves a control valve from a rest position to a lifted relief position by energizing the solenoid to a first energy state, and energizing the solenoid to move the control valve from the lifted relief position to a lifted injection position includes energizing the solenoid to a second, higher energy state.

INDUSTRIAL APPLICABILITY

Operating fuel system 18 may include rotating cam 64 to advance plunger 58 to increase a pressure of fuel in plunger cavity 60. As discussed herein increasing a pressure of fuel in plunger cavity 60 may occur when spill valve 48 is in a closed position. Operating fuel system 18 may further include energizing or deenergizing solenoid 44, during the advancing plunger 58, to move control valve 36 from one of the rest position blocking control passage 70 from low pressure drain 68 or the lifted injection position where control passage 70 is fluidly connected to low pressure drain 68, to the lifted relief position. Positioning control valve 36 at the lifted relief position fluidly connects high pressure passage 66 to relief passage 76, to relieve a pressure of fuel in plunger cavity 58.

With the pressure relieved, control valve 36 may be moved from the lifted relief position to the rest position or to the lifted injection position. Moving control valve 36 to the lifted injection position or returning control valve 36 to the rest position blocks high pressure passage 66 from relief passage 70 to end pressure relief. Nozzle check 30 is held closed via a pressure of fuel on closing hydraulic surface 32 during relieving pressure of fuel in plunger cavity 60. As discussed above, control valve 36 can be moved to different positions depending upon the energy state of solenoid 44. In an embodiment, solenoid 44 can be energized a first time in an engine cycle to move control valve 36 to the lifted injection position during advancing plunger 58, and energized a second time in the same engine cycle to move control valve 36 to the lifted injection position during advancing plunger 58.

An initial energizing of solenoid 44 to move control valve 36 from the rest position to the lifted relief position may include energizing solenoid 44 to a first energy state, and each of energizing solenoid 44 a first time and energizing solenoid 44 a second time in the same engine cycle to move control valve 36 to the lifted injection position can include energizing solenoid 44 to a second, higher energy state. In this way it can be readily envisioned that control valve 36 might be moved from the rest position to the lifted relief position with a lower magnitude control current, in opposition to a lesser net spring bias, and then moved from the lifted relief position to the lifted injection position with a greater magnitude control current, in opposition to a greater net spring bias. In some applications, control valve 36 can also be toggled between the lifted relief position and the lifted injection position by alternating between the lower magnitude control current and the greater magnitude control current, relieving pressure between multiple injections in an engine cycle. Still other variations will be apparent to those skilled in the art.

Figure 7:
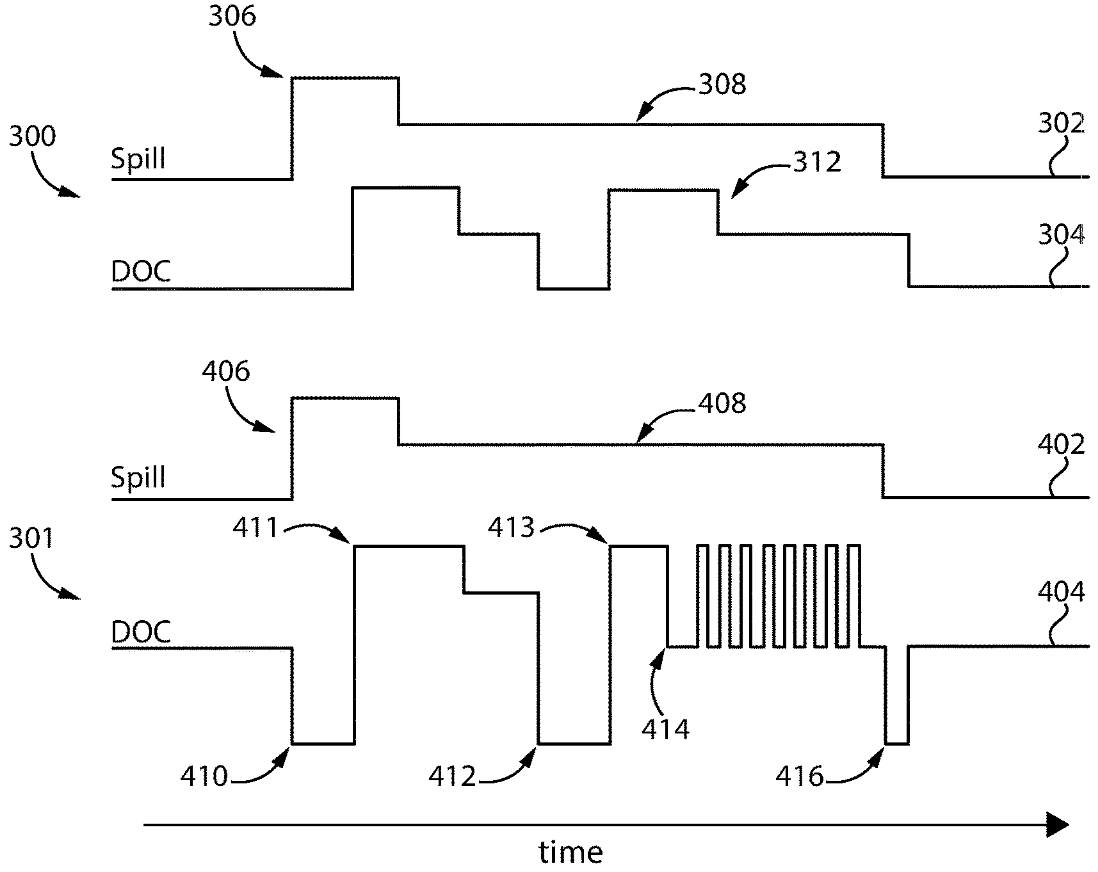
FIG. 7 is a graph of control currents in a fuel injector illustrating a first strategy in comparison to a pressure relief strategy according to one embodiment.

Referring also now to FIG. 7, there is shown a first set of control current traces 300 illustrating a spill current 302 and a DOC (direct operated check) or control valve current 304 in an operating strategy where pressure relief is not used. In this example spill valve 48 is initially open, and control valve 36 is initially closed. At approximately 306 solenoid 54 can be energized to close spill valve 48. Rotation of cam 64 against tappet 62 can cause plunger 58 to advance and begin building pressure in plunger cavity 60 and connected passages in fuel injection 24. At approximately 310 solenoid 44 is energized to open control valve 36 and permit nozzle check 30 to open commencing an injection of fuel. At approximately 312 solenoid 44 is energized again to perform a second injection of fuel. Numeral 308 denotes a period generally where spill valve 48 is closed and plunger 58 is advancing such that pressure is continuing to build corresponding potentially to conditions where over-pressurization may occur. The states represented by control current traces 300 occur in the same engine cycle.

Control currents 301 show a spill current at 402 and a DOC current at 404 during one example engine cycle. In this example, spill valve 48 is initially open, and control valve 36 is initially at a lifted relief position, for example where a lower magnitude control current is applied to solenoid 44. At approximately 406 spill valve 48 is closed. At approximately the same time, or potentially earlier, at 410 the DOC current is reduced to permit nozzle check 30 to close. The DOC current 404 is then increased to a greater magnitude at approximately 411 to move control valve 36 from the rest position to a lifted injection position, and subsequently reduced at 412 to move control valve 36 to the rest position (closed) to end the fuel injection. At approximately 413 DOC current 404 is increased again to move control valve 36 again to the lifted injection position to start a second fuel injection. At 414 DOC current 404 is reduced once more, and thereafter toggled between the lifted injection position and the lifted relief position to perform a plurality of additional fuel injections. Accordingly, during a period of time shown generally at 408 where an over-pressurization risk exists the pressure relief events between injections can prevent over-pressurization.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A fuel injector comprising:

an injector housing including a nozzle;

a nozzle check movable to open and close the nozzle and including a closing hydraulic surface;

an electrically actuated control valve assembly including a control valve, and an armature;

a high pressure passage, a low pressure drain, a control passage, a check control chamber fluidly connected to the control passage, and a valve seat are each formed in the injector housing, and a relief passage is formed by at least one of the injector housing or the control valve; and the control valve is movable among a rest position in contact with the control valve seat and blocking the control passage from the low pressure drain to maintain a high pressure in the control chamber, a lifted injection position where the control passage is fluidly connected to the low pressure drain and the control valve blocks the high pressure passage, and a lifted relief position where the control valve does not block the high pressure passage, the high pressure passage is fluidly connected to the relief passage, and the control passage is blocked from the low pressure drain.

2. The fuel injector of claim 1 wherein at the lifted relief position the control valve blocks the control passage from both the low pressure drain and the relief passage.

3. The fuel injector of claim 1 wherein the control valve is movable a travel distance linearly among the rest, lifted injection, and lifted relief positions, and at the lifted relief position the control valve is between the rest position and the lifted injection position.

4. The fuel injector of claim 3 wherein the rest position includes a first stop position and the lifted injection position includes a second stop position, and further comprising a first biasing spring biasing the control valve in at least a portion of the travel distance, and a second biasing spring biasing the control valve in only a portion of the travel distance.

5. The fuel injector of claim 4 wherein the first biasing spring includes a closing biasing spring biasing the control valve toward the rest position, and the second biasing spring includes a lifting biasing spring biasing the control valve away from the rest position.

6. The fuel injector of claim 4 wherein each of the first biasing spring and the second biasing spring includes a closing biasing spring biasing the control valve toward the rest position.

7. The fuel injector of claim 1 wherein a plunger cavity is formed in the injector housing and fluidly connected to the high pressure passage.

8. The fuel injector of claim 7 further comprising a plunger movable in the plunger cavity, and a tappet coupled to the plunger.

9. The fuel injector of claim 7 wherein the injector housing defines a low pressure space, and further comprising an electrically actuated spill valve movable in the injector housing between an open position fluidly connecting the plunger cavity to the low pressure space, and a closed position.

10. A fuel system comprising:

a fuel supply;

a fuel injector including therein a fuel inlet fluidly connected to the fuel supply, a high pressure passage extending from a plunger cavity, a control passage, and a low pressure drain;

the fuel injector further including an electrically actuated spill valve fluidly between the fuel inlet and the plunger cavity, a nozzle check having a closing hydraulic surface exposed to a fluid pressure of the control passage, and an electrically actuated control valve;

the control valve including a 3-position valve fluidly blocking the control passage from the low pressure drain at a rest position, and fluidly connecting the control passage to the low pressure drain at a lifted injection position; and the fuel injector further including therein a relief passage, and the control valve fluidly connects the high pressure passage to the relief passage and blocks the control passage from the low pressure drain at a lifted relief position that is between the rest position and the lifted injection position.

11. The fuel system of claim 10 wherein the rest position includes a first stop position and the lifted injection position includes a second stop position.

12. The fuel system of claim 10 further comprising a biasing spring biasing the control valve in only a portion of a travel distance between the rest position and the lifted injection position.

13. The fuel system of claim 12 wherein the biasing spring includes a closing biasing spring biasing the control valve toward the rest position.

14. The fuel system of claim 12 wherein the biasing spring includes a lifting biasing spring biasing the control valve away from the rest position.

15. The fuel system of claim 12 further comprising a second biasing spring biasing the control valve in the full travel distance between the rest position and the lifted injection position.

16. A method of operating a fuel system comprising:

advancing a plunger in the fuel system to increase a pressure of fuel in a plunger cavity;

energizing or deenergizing a solenoid in a fuel injector, during the advancing the plunger, to move a control valve to a lifted relief position from one of a rest position blocking a control passage from a low pressure drain or a lifted injection position where the control passage is fluidly connected to the low pressure drain;

fluidly connecting a high pressure passage extending from the plunger cavity to a relief passage, based on the moving the control valve to the lifted relief position, to relieve a pressure of fuel in the plunger cavity;

blocking the control passage from the relief passage at the lifted relief position; and holding a nozzle check in the fuel injector closed via a pressure of fuel on a closing hydraulic surface of the nozzle check exposed to a fluid pressure of the control passage, during the relieving the pressure of fuel in the plunger cavity.

17. The method of claim 16 further comprising:

energizing the solenoid a first time in an engine cycle to move the control valve to the lifted injection position during the advancing the plunger; and energizing the solenoid a second time in the engine cycle to move the control valve to the lifted injection position during the advancing the plunger.

18. The method of claim 17 wherein the energizing or deenergizing the solenoid includes energizing the solenoid to a first energy state, and each of the energizing the solenoid a first time and the energizing the solenoid a second time includes energizing the solenoid to a second, higher energy state.

19. The method of claim 18 further comprising applying a lesser spring bias to the control valve in a portion of a travel path between the rest position and the lifted injection position, and applying a greater spring bias to the control valve in a portion of the travel path from the lifted relief position to the lifted injection position.

20. The method of claim 19 further comprising disengaging a biasing spring from the control valve in a portion of the travel path.

* * * * *